US008868635B2

(12) United States Patent
Gilder et al.

(10) Patent No.: US 8,868,635 B2
(45) Date of Patent: Oct. 21, 2014

(54) SYSTEM AND METHOD FOR NEAR-OPTIMAL MEDIA SHARING

(75) Inventors: Mark Richard Gilder, Clifton Park, NY (US); Osman Rifki Oksoy, New York, NY (US); Michael Andrew Woellmer, Troy, NY (US); Kevin Anthony Mercurio, Orangeburg, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 817 days.

(21) Appl. No.: 12/546,114

(22) Filed: Aug. 24, 2009

(65) Prior Publication Data

US 2011/0047207 A1    Feb. 24, 2011

(51) Int. Cl.
*G06F 15/16* (2006.01)
*H04H 60/79* (2008.01)
*H04L 29/08* (2006.01)
*H04H 60/04* (2008.01)

(52) U.S. Cl.
CPC .......... *H04L 67/104* (2013.01); *H04L 67/2814* (2013.01); *H04L 67/1068* (2013.01); *H04L 67/1078* (2013.01); *H04L 67/288* (2013.01); *H04L 67/101* (2013.01); *H04H 60/79* (2013.01); *H04L 67/1002* (2013.01); *H04H 60/04* (2013.01)
USPC .............................. 709/201; 709/203; 709/205

(58) Field of Classification Search
CPC ....................................................... G06F 15/16
USPC ........................................ 709/201, 203, 205
See application file for complete search history.

(56) References Cited

U.S. PATENT DOCUMENTS

| 7,174,433 | B2 | 2/2007 | Kottomtharayil et al. | |
|---|---|---|---|---|
| 7,426,637 | B2 | 9/2008 | Risan et al. | |
| 7,756,915 | B2 * | 7/2010 | Ben-Yaacov et al. | 707/899 |
| 7,792,105 | B2 * | 9/2010 | Keller et al. | 370/390 |
| 2006/0271688 | A1 * | 11/2006 | Viger et al. | 709/227 |
| 2007/0086443 | A1 * | 4/2007 | Zhang et al. | 370/352 |
| 2007/0133565 | A1 * | 6/2007 | Hyun et al. | 370/395.52 |
| 2007/0250626 | A1 * | 10/2007 | Phan | 709/225 |
| 2008/0005027 | A1 | 1/2008 | Mullins | |
| 2008/0115170 | A1 * | 5/2008 | Ray et al. | 725/58 |
| 2008/0140849 | A1 | 6/2008 | Collazo | |

(Continued)

FOREIGN PATENT DOCUMENTS

WO      2007085592 A1    8/2007

OTHER PUBLICATIONS (Zhang et al.) "Coolstreaming/DONet: A Data-driven Overlay Network for Peer-to-Peer Live Media Streaming"—Infocom 2005, 24th Ann. Jt. Conf of the IEEE Comp. and Comm. Societies, Proc. IEEE vol. 3, 13-17, pp. 2102-2111.
Great Britain Search Report dated Nov. 25, 2010.

*Primary Examiner* — Emmanuel L Moise
*Assistant Examiner* — Marie Georges Henry
(74) *Attorney, Agent, or Firm* — Fletcher Yoder, P.C.

(57) ABSTRACT

A media content sharing system includes multiple broadcast operation centers that together are configured to automatically acquire and distribute media content among one another based upon the media content needs and inventories of each participating broadcast operation center. The media sharing system architecture eliminates any single-point of system failure such that an inventory of media content corresponding to a particular broadcast operation center remains available to broadcast operation centers remaining on the media content sharing system subsequent to failure of the particular broadcast operation center.

19 Claims, 5 Drawing Sheets

(56) References Cited

U.S. PATENT DOCUMENTS

| | | | |
|---|---|---|---|
| 2009/0006536 A1* | 1/2009 | Elliott et al. | 709/203 |
| 2009/0019375 A1 | 1/2009 | Garofalo | |
| 2009/0030976 A1* | 1/2009 | Shukla et al. | 709/203 |
| 2009/0063419 A1* | 3/2009 | Nurminen et al. | 707/3 |
| 2009/0138906 A1* | 5/2009 | Eide et al. | 725/32 |
| 2009/0192999 A1 | 7/2009 | Wang | |
| 2009/0198766 A1* | 8/2009 | Chen et al. | 709/202 |
| 2010/0075626 A1* | 3/2010 | Titus et al. | 455/404.1 |

* cited by examiner

SYSTEM AND METHOD FOR NEAR-OPTIMAL MEDIA SHARING

BACKGROUND

This invention relates generally to media sharing, and more particularly, to a framework and tools for sharing media content across a set of broadcast operation centers.

Sharing of media content across a set of broadcast operation centers has typically been addressed by manually checking what media is needed at each site or location independently. Further, known solutions such as those systems that employ a central database or central server undesirably lend themselves to a single point of system failure and require all sites to be known a-priori.

It would be desirable to provide a system and method of media sharing across a set of broadcast operation centers that overcomes the foregoing disadvantages. The system and method of media sharing should provide a global view of media asset needs and provide automated movement of content where it is needed to allow content to be shared among any peer in the participating network while eliminating the possibility of a single-point of system failure.

BRIEF DESCRIPTION

Briefly, in accordance with one embodiment, a media sharing system comprises a plurality of broadcast operation centers configured to automatically acquire and distribute media content among one another based upon the media content needs and inventories of each participating broadcast operation center, the media sharing system being further configured to eliminate any single-point of system failure such that an inventory of media content corresponding to a particular broadcast operation center remains available to broadcast operation centers remaining on the media content sharing system subsequent to failure of the particular broadcast operation center.

According to another embodiment, a method of sharing media content between a plurality of broadcast operation centers for a corresponding media content sharing system comprises automatically acquiring and distributing media content among the broadcast operation centers based upon the media content needs and inventories of each participating broadcast operation center to eliminate any single-point of media content sharing system failure, such that an inventory of media content corresponding to a particular broadcast operation center remains available to broadcast operation centers remaining on the media content sharing system subsequent to failure of the particular broadcast operation center.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
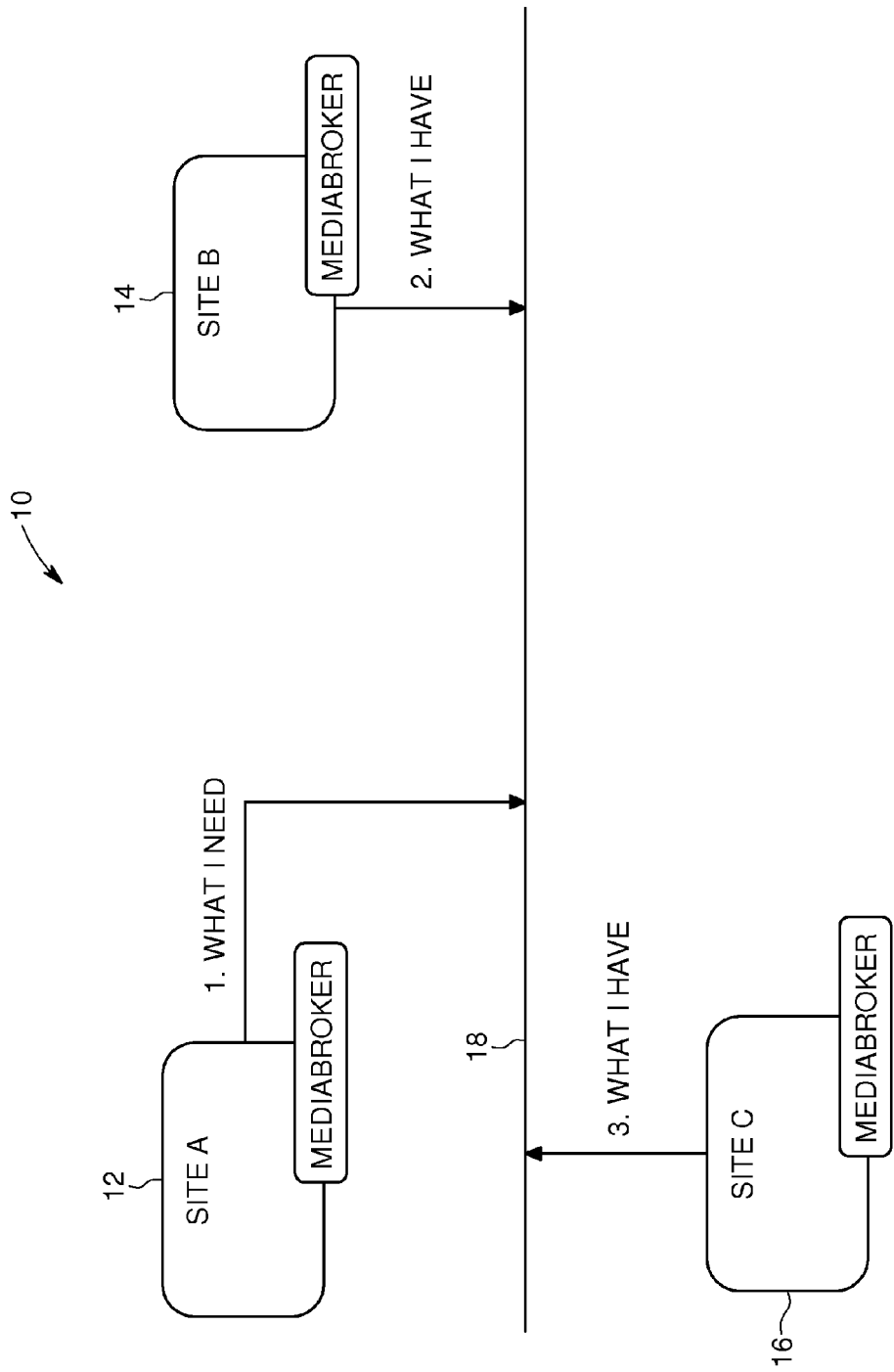
FIG. 1 is a simplified block diagram illustrating a media broker process according to one embodiment.

FIG. 1 is a simplified block diagram illustrating a media broker system 10 according to one embodiment. Media broker system 10 includes three media broker sites including site A 12, site B 14, and site C 16. The number of media broker sites shown is exemplary and any number of media broker sites may be included in the media broker system 10 depending on the particular application.

Media broker system 10, according to one embodiment, operates when site A 12 broadcasts a request for media content over a set of distribution channels, i.e., standard definition, high definition, over the air, internet, etc. Typically, within the broadcast operation center domain, each center is viewed as a silo with regard to acquisition and distribution of media content. Content to be distributed by one center must be ingested locally. Media broker system 10 provides a global view of media assets and facilitates the automatic sharing of media across all sites within the system.

More particularly, media broker system 10 comprises an overlay network, described in further detail below, including optimizers such as that depicted in FIG. 4 running at each node 12, 14, and 16. Content needs for a particular site such as described above for site A 12 are broadcast over this network 18 to see which sites can satisfy the media request. Further, the peer sites, such as sites B 14 and C 16, broadcast their inventories of media content over network 18. The requisite optimizer corresponding to the requesting site then determines which site should satisfy the content in cases where multiple sources are found. In this manner, media broker system 10 also facilitates automatic content movement to disaster recovery sites as well as provides third parties with the ability to supply content.

The overlay network provides a global view of media asset needs and provides automated movement of content to where it is needed. This solution allows content to be shared among any peer participating in the network. A single point of system failure is eliminated since the media broker system 10 neither requires or includes a central database that could otherwise cause the system to fail along with failure of the central database. Media broker system 10 thus operates by automatically sharing media content across a set of broadcast operation centers 12, 14, 16 without the need to manually check what media is needed at each site or location, independently in a manner required with present techniques for sharing media content across a set of broadcast operation centers. Media broker system 10 advantageously also operates by automatically sharing of media content across a set of broadcast operation centers 12, 14, 16 without requiring that each site be identified a-priori; and peer sites may drop off the system 10 and/or new sites may automatically appear in the system 10 in random fashion with substantially no impact on system operability.

Figure 2:
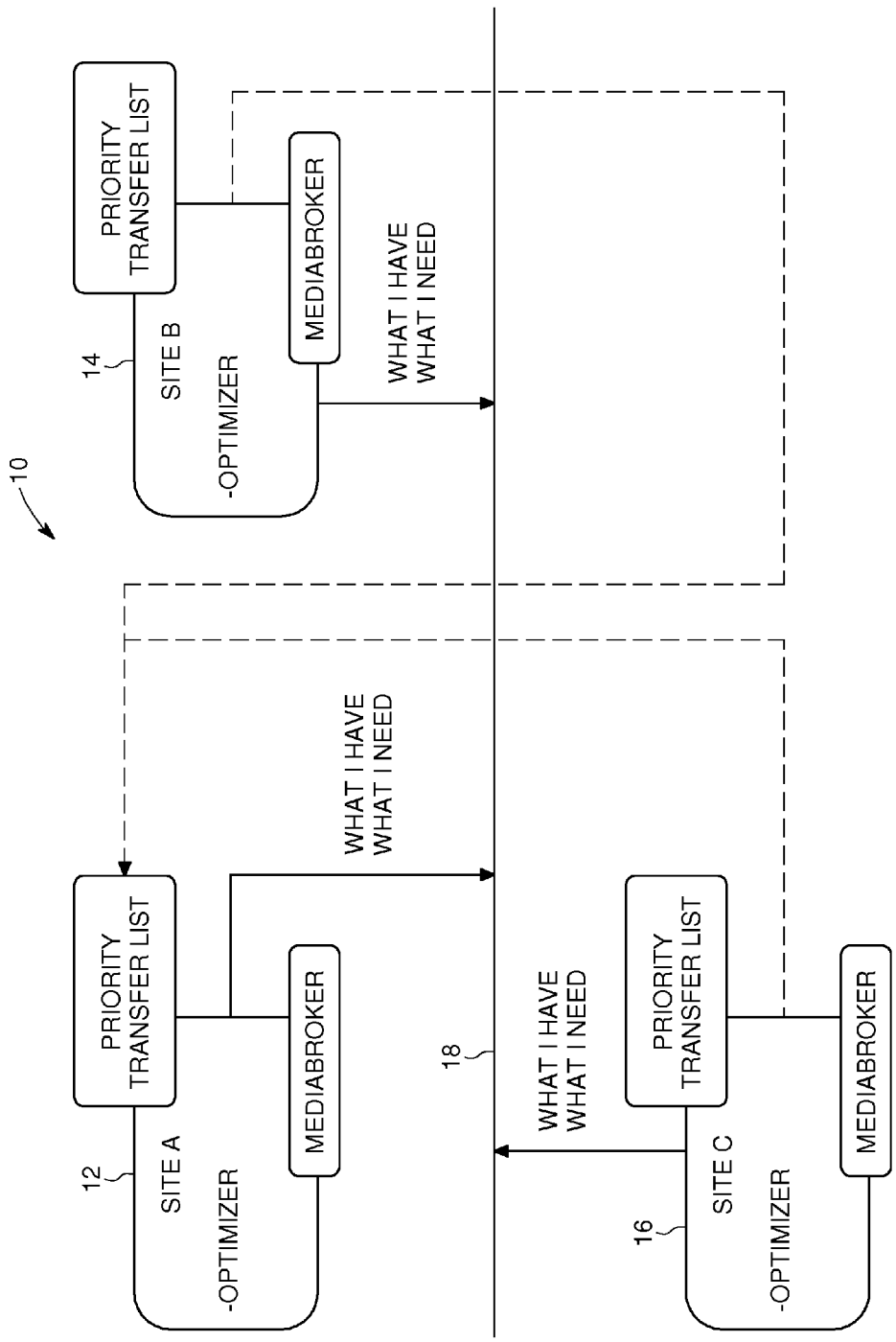
FIG. 2 is a simplified block diagram illustrating a more detailed media broker process for the system depicted in FIG. 1.

FIG. 2 is a simplified block diagram illustrating a more detailed view of media broker system 10 depicted in FIG. 1.

Media broker system 10 provides a global view of its media inventories and needed media assets over all participating broadcast domains. This is accomplished by having each member site (peer) participating in the network 18 to register with each other. According to one embodiment, all asset needs are broadcast to each member peer via, for example, a web service such as API. Any peers capable of satisfying the request respond positively and determine the best method to transfer the content based on their attributes. According to one aspect, each media broker site optimizer analyzes any received media content and processes the received media content if necessary to ensure the received media content is transferred in a format that is recognizable and workable via the corresponding media broker site.

Figure 3:
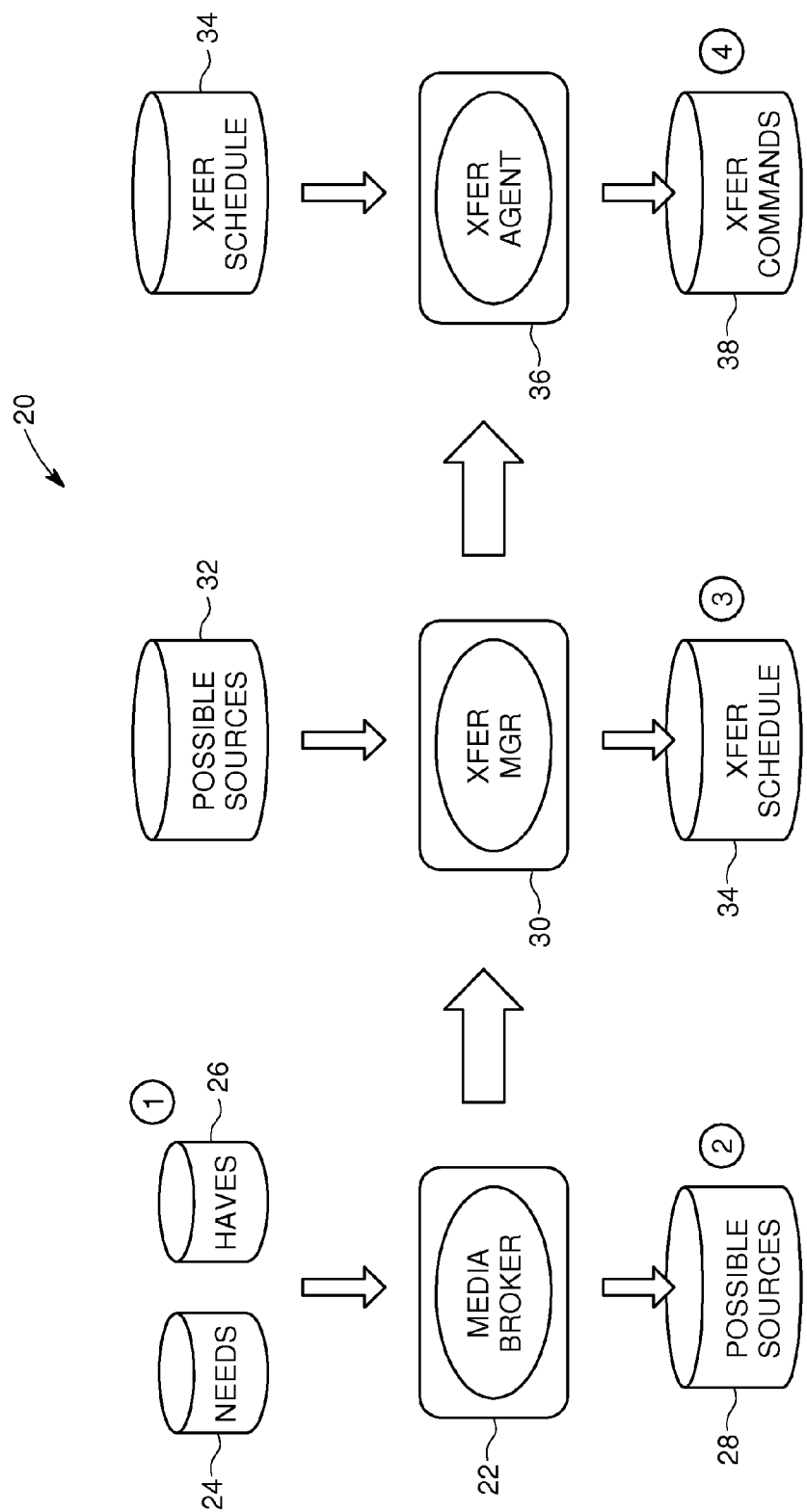
FIG. 3 is a simplified block diagram illustrating a media broker processing chain according to one embodiment.

FIG. 3 is a simplified block diagram illustrating a media broker processing chain 20 according to one embodiment. Each media broker 22 participating on the network 18 receives the media content needs 24 and haves (inventories) 26 of each peer media broker participating on the network. This is accomplished, as stated above, by having each member (peer) participating in the network to register with one another. Any peers 28 capable of satisfying a request respond positively and determine the best method to transfer the content based on their attributes. This communication structure provides an automated way to notify each participating media broker 22 about changing needs and haves. Media source tables, local to each peer, if used, can be updated by adding and/or removing media content sources from the table.

A transfer manager 30 functions to determine the best partner site 32 from among the possible sources 28 to serve as a source for a required piece of content. Once possible source(s) 32 are identified, they are entered into a transfer schedule 34; and a transfer agent 36 functions to generate and transmit transfer commands 38 to requisite transfer hardware elements and devices.

This communication structure reduces duplication of media content sharing efforts since only a single ingest location and quality control pass is required across the set of broadcast centers participating in the media broker system 10. Since media content can now be shared through participating peers in the overlay network, the media asset only needs to be ingested once.

As used herein, the term content is used to uniquely identify a specific piece of media. The term Site represents a site which either ingests, archives, and/or plays out content. The term peers signifies a subset of sites which can participate in communications with Site. The term needs represents content required by Site. The term availability denotes content available at Site. The term possible sources represents a subset of sites which can provide the needed content. The term media locator is a system which identifies the set of peers within the network that can provide the required content. The term transfer manager is a system(s) which is/are used to calculate the transfer schedule based on requirements of participating Sites. The term transfer agent is a system(s) which is/are interact with required external hardware to execute the desired or requisite transfer schedule.

Figure 4:
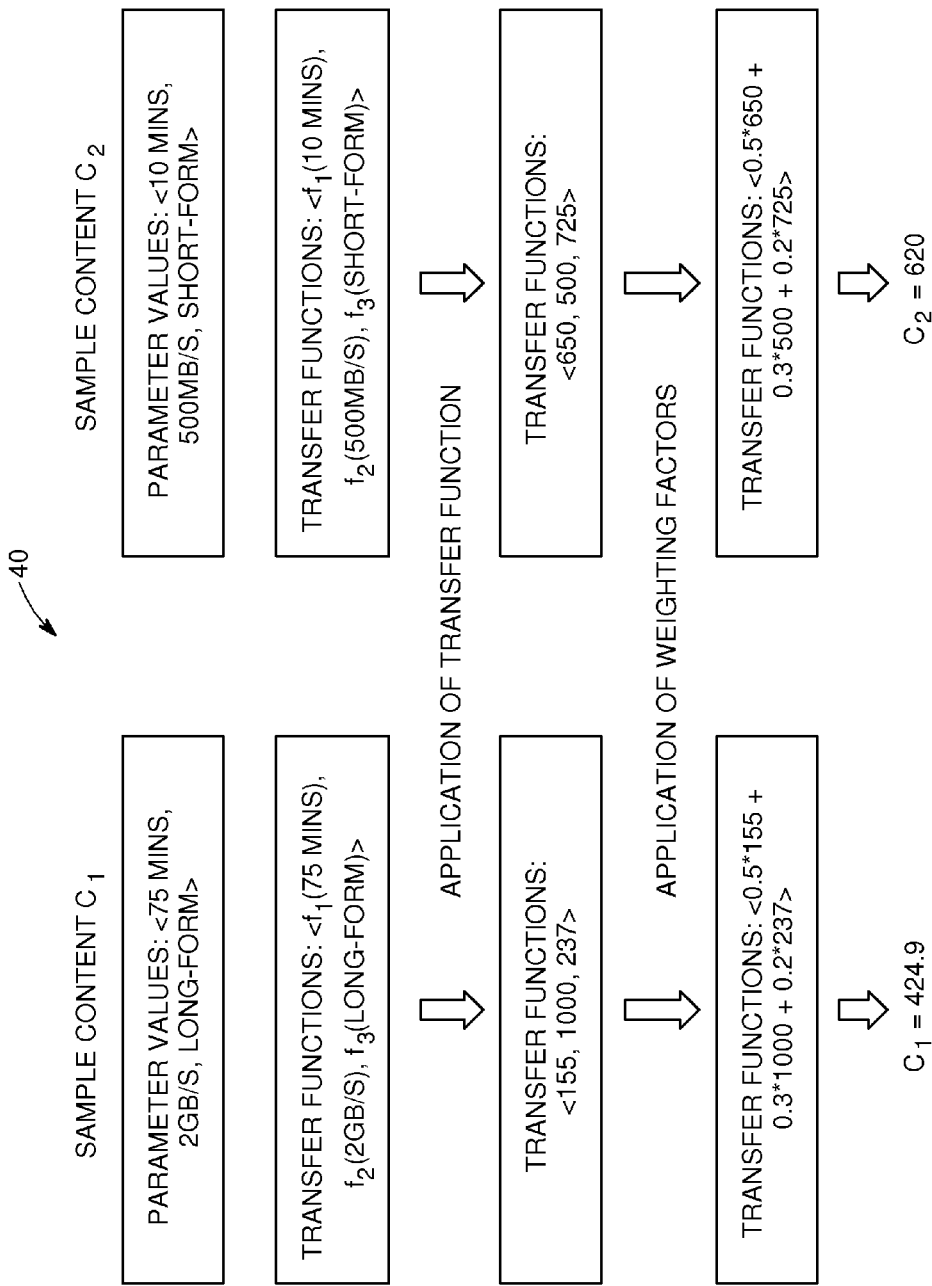
FIG. 4 illustrates an overlay system optimizer according to one embodiment.

According to one aspect, the transfer manager comprises a transfer cost model that may be an optimizer such as depicted in FIG. 4 to generate the transfer schedule. The cost model is specific to a particular set of wants and needs and may be specific, for example, to a particular end user or application. The cost model may, for example, generate the transfer schedule in response to, without limitation, needed time, available bandwidth, required bandwidth, and/or content type.

FIG. 4 illustrates a media broker cost optimizer 40 used by the transfer manager to determine an appropriate transfer schedule according to one embodiment. Three n-tuples are constructed representing to determine the near optimal cost for a specific piece of media content. These n-tuples are constructed to represent the requisite or desired parameter values, transfer functions and weighting constraints respectively for each parameter to be evaluated by the cost optimizer. These n-tuples may be represented, for example, as Parameter values: $<P_1, \ldots, P_n>$; Transfer functions: $<f_1(P_1), \ldots, f_n(P_n)>$; and Parameter weights: $<W_1, \ldots, W_n>$ based on a given cost optimizer consisting of n parameters.

The transfer manager is responsible for the actual transfer of content from a remote site to a local site hosting the transfer manager. The content is selected based on a cost optimizer which uses a set of parameters to determine a near optimal transfer schedule, i.e., on-air-time/time-to broadcast, file format, available link bandwidth, required link bandwidth, and content type.

An available bandwidth parameter may be, for example, 500 Mb/s. The transfer function is a parameter specific function which translates the corresponding parameters into numeric values such that higher values indicate a better value according to one embodiment. A weighting factor adjusts the importance of each value in a range from about 0.0 to 1.0 according to one embodiment.

FIG. 4 illustrates operation of a transfer manager cost optimizer 40 according to one embodiment in which $P_1$ represents on-air-time/time-to-broadcast and is weighted at 50%, $P_2$ represents available link bandwidth and is weighted at 30%, and $P_3$ represents content type and is weighted at 20%. A first sample content score $C_1$ is determined to be 424.9 while a second sample content score $C_2$ is determined to be 620. Since the value of $C_2$ is higher than the value of $C_1$, the second sample content is transferred by the transfer manager ahead of the first sample content.

Figure 5:
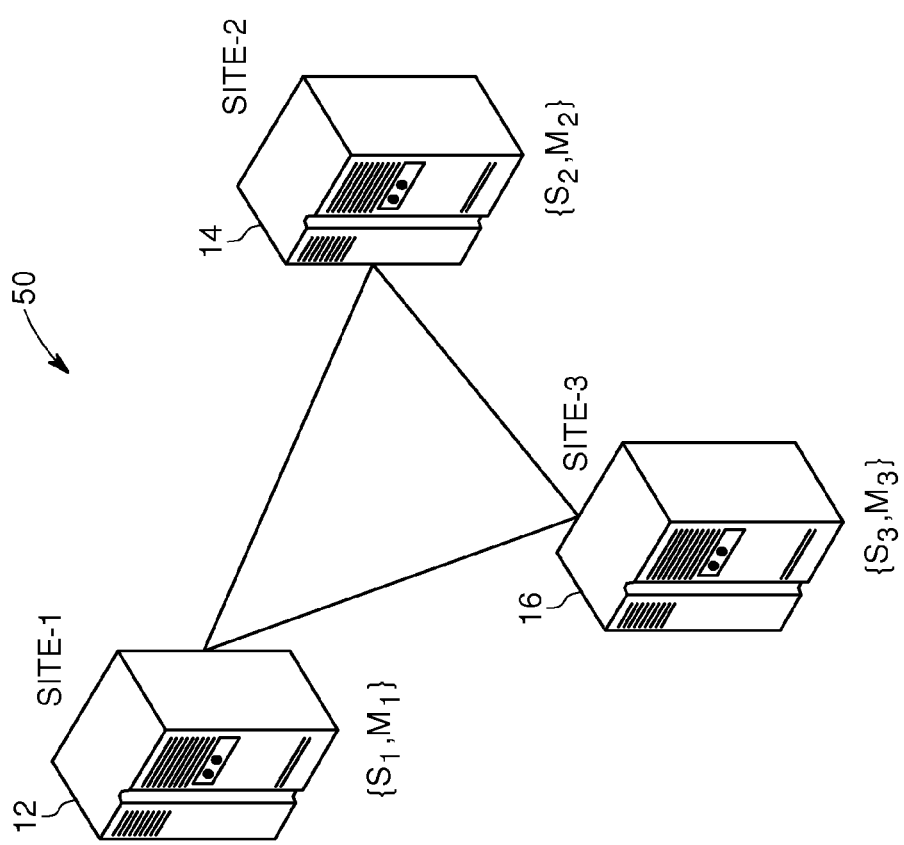
FIG. 5 is a simplified diagram illustrating one embodiment of a network topology associated with the media broker system depicted in FIGS. 1 and 2.

FIG. 5 is a simplified diagram illustrating one embodiment of a network topology 60 associated with media broker system 10. Each site 12, 14, 16 is connected to every other site through a dedicated communication link. Each site has a schedule of content to be broadcast ($S_i$) and a list of required content which is not accessible locally ($M_i$).

Automated media content distribution is accomplished via the overlay network which determines which peers can supply needed content for a given peer. Peers requiring media assets determine which data source should supply the content based on a cost function, as discussed above. This cost function uses several attributes in its determination including, without limitation, time requirements, file format requirements, network requirements, and so on.

The media broker embodiments described herein advantageously allow a single place to view content needs across an entire broadcast domain while reducing duplication of efforts for ingestion of required media. The communication structure automatically distributes content to sites where it is needed while determining the lowest cost source of media. The communication structure further eliminates any central point of communication system failure such that peers may dynamically enter and exit the overlay network to share local and global media content, regardless of whether any broadcast operation center from a plurality of broadcast operation centers on the media content sharing system experiences a communication failure. This feature also provides for multiple broadcast operation center failures on a media content sharing system with more than three broadcast operation centers.

Further, peers need not be specified a priori and may register, for example, at run-time. Only one peer in the current network is required to be known beyond the dynamically entering or exiting peer.

Although a central server could be employed to provide a media content sharing network, such a communication structure disadvantageously introduces a single-point of system failure that shuts down the entire network or otherwise causes the communication network to malfunction.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A media content sharing system comprising:
a plurality of broadcast operation centers configured to automatically acquire and distribute media content among one another based upon media content needs and inventories of media content stored in each broadcast operation center,
wherein the media content needs are communicated from each broadcast operation center to the other broadcast operation centers,
the media content sharing system is configured to eliminate any single-point of system failure in the media content sharing system by ensuring that an inventory of media content corresponding to a particular broadcast operation center remains available via decentralized sharing to the other broadcast operation centers remaining on the media content sharing system subsequent to failure of the particular broadcast operation center through the automatic acquisition and distribution of the media content among the plurality of broadcast operation centers, and
wherein the plurality of broadcast operation centers are configured to automatically acquire and distribute the media content among the plurality of broadcast operation centers by acquiring and distributing the media content in response to commands from an overlay network based on an optimizer corresponding to each broadcast operation center.

2. The media content sharing system according to claim 1, wherein the system does not contain any central database or any central server.

3. The media content sharing system according to claim 1, further comprising an overlay network.

4. The media content sharing system according to claim 3, wherein the overlay network comprises a plurality of optimizers configured to control exchange of media content between the plurality of broadcast operation centers.

5. The media content sharing system according to claim 4, wherein each optimizer is configured to control the exchange of media content based on a corresponding cost model.

6. The media content sharing system according to claim 5, wherein the cost model comprises attributes selected from network type, file-format, time-to-broadcast, needed time, available bandwidth, required bandwidth, and content type.

7. The media content sharing system according to claim 1, wherein each broadcast operation center comprises an optimizer configured to control the acquisition and distribution of media content between itself and other broadcast operation centers.

8. The media content sharing system according to claim 7, wherein each optimizer is configured to control the acquisition and distribution of media content based on a corresponding cost model.

9. The media content sharing system according to claim 1, further comprising a communication network for acquiring and distributing the media content, the communication network selected from wireless networks, wired networks, standard definition networks, high definition networks, and the internet.

10. The media content sharing system according to claim 9, further configured to allow an out of network third party broadcast operation center the ability to supply media content to the network such that the third party media content is available to the media content sharing system broadcast operation centers.

11. The media content sharing system according to claim 1, further configured to facilitate automatic content movement to at least one disaster recovery site.

12. The media content sharing system according to claim 1, wherein each broadcast operation center is configured to acquire via a single ingestion, media content available from peer broadcast operation centers on the media content sharing system to complete a corresponding library of media content that includes all media content available from the plurality of broadcast operation centers.

13. The media content sharing system of claim 1, wherein at least one of the plurality of optimizers is configured to determine which of the broadcast operation centers should source the automatic acquisition and distribution or one or more factors for determining which of the broadcast operation centers should source the automatic acquisition and distribution; and
wherein the automatic acquisition and distribution comprises acquiring and distributing the media content from the broadcast operation center that is to be the source.

14. A method of sharing media content between a plurality of broadcast operation centers for a corresponding media content sharing system, the method comprising:
automatically acquiring and distributing media content among the broadcast operation centers based upon media content needs and inventories of media content stored in each participating broadcast operation center, the needs being communicated from each participating broadcast operation center to the other participating broadcast operation centers, wherein the automatically acquired and distributed media content is useful to eliminate any single-point of failure in the media content sharing system by ensuring that an inventory of media content corresponding to a particular broadcast operation center remains available via decentralized sharing to the other broadcast operation centers remaining on the media content sharing system subsequent to failure of the particular broadcast operation center through the automatic acquisition and distribution of the media content among the plurality of broadcast operation centers; and
automatically acquiring and distributing media content among the plurality of broadcast operation centers comprises acquiring and distributing the media content in response to commands from an overlay network, which comprises acquiring and distributing the media content for each broadcast operation center based on an optimizer corresponding to each broadcast operation center.

15. The method of claim 14, wherein automatically acquiring and distributing media content among the plurality of broadcast operation centers comprises acquiring and distributing the media content in the absence of any central database or any central server.

16. The method of claim 1, wherein acquiring and distributing the media content for each broadcast operation center in response to an optimizer corresponding to each broadcast operation center comprises acquiring and distributing the media content for each broadcast operation center based on a cost function corresponding to each broadcast operation center.

17. The method of claim 16, wherein acquiring and distributing the media content based on a cost function comprises acquiring and distributing the media content based on attributes selected from network type, file-format, time-to-broadcast, needed time, available bandwidth, required bandwidth, and content type.

18. The method of claim 14, wherein automatically acquiring and distributing media content among the broadcast operation centers comprises acquiring for each broadcast operation center via a single ingestion, media content available from peer broadcast operation centers on the media content sharing system to complete a corresponding library of media content that includes all media content available from the plurality of broadcast operation centers.

19. The method of claim 14, wherein at least one of the plurality of optimizers is configured to determine which of the broadcast operation centers should source the automatic acquisition and distribution or one or more factors for determining which of the broadcast operation centers is to be the source the automatic acquisition and distribution; and wherein the automatic acquisition and distribution comprises acquiring and distributing the media content from the broadcast operation center that is to be the source.

* * * * *